United States Patent [19]

Murakami

[11] 3,831,465
[45] Aug. 27, 1974

[54] CONTROL SYSTEM FOR AUTOMATIC TRANSMISSION

[75] Inventor: Noboru Murakami, Nagoya, Japan

[73] Assignee: Aisin Seiki Kabushiki Kaisha, Kariya-shi, Aichi-ken, Japan

[22] Filed: Oct. 2, 1972

[21] Appl. No.: 294,106

[30] Foreign Application Priority Data
Oct. 2, 1971   Japan.............................. 46-77243

[52] U.S. Cl................................. 74/869, 74/DIG. 1
[51] Int. Cl........................................... B60k 23/02
[58] Field of Search.......... 74/864, 868, 869, 752 C, 74/DIG. 1; 192/109 F

[56]   References Cited
UNITED STATES PATENTS

| | | | |
|---|---|---|---|
| 3,295,387 | 1/1967 | Leonard et al. | 74/864 |
| 3,386,540 | 6/1968 | Horsch et al. | 192/.09 |
| 3,546,973 | 12/1970 | Koichi Ohie et al. | 74/868 |
| 3,561,293 | 2/1971 | Shajiro Fujita et al. | 74/869 |
| 3,561,294 | 2/1971 | Tetsuya Iijima | 74/869 |
| 3,563,115 | 2/1971 | Tetsuya Iijima et al. | 74/864 |
| 3,590,663 | 7/1971 | Nobova Murakami et al. | 74/752 |
| 3,618,424 | 11/1971 | Golan et al. | 74/DIG. 1 |
| 3,623,382 | 11/1971 | Chana | 74/864 |
| 3,675,512 | 7/1972 | Koichivo Nivozawa | 74/869 |
| 3,707,891 | 1/1973 | Asano et al. | 74/869 |
| 3,752,015 | 8/1973 | Murakami | 74/869 |

*Primary Examiner*—Samuel Scott
*Assistant Examiner*—Allan Russell Burke
*Attorney, Agent, or Firm*—Stevens, Davis, Miller & Mosher

[57]   ABSTRACT

In an automotive power transmission having at least two friction engaging devices to establish different forward speed ratio power trains therethrough, a hydraulic control system therefor is provided with a cooperating pair of modulator valves. Fluid pressures selectively fed to and from the friction engaging devices under the control of various shift valve devices are modulated by the modulator valves to minimize the jerks that may be produced during the transition.

10 Claims, 10 Drawing Figures

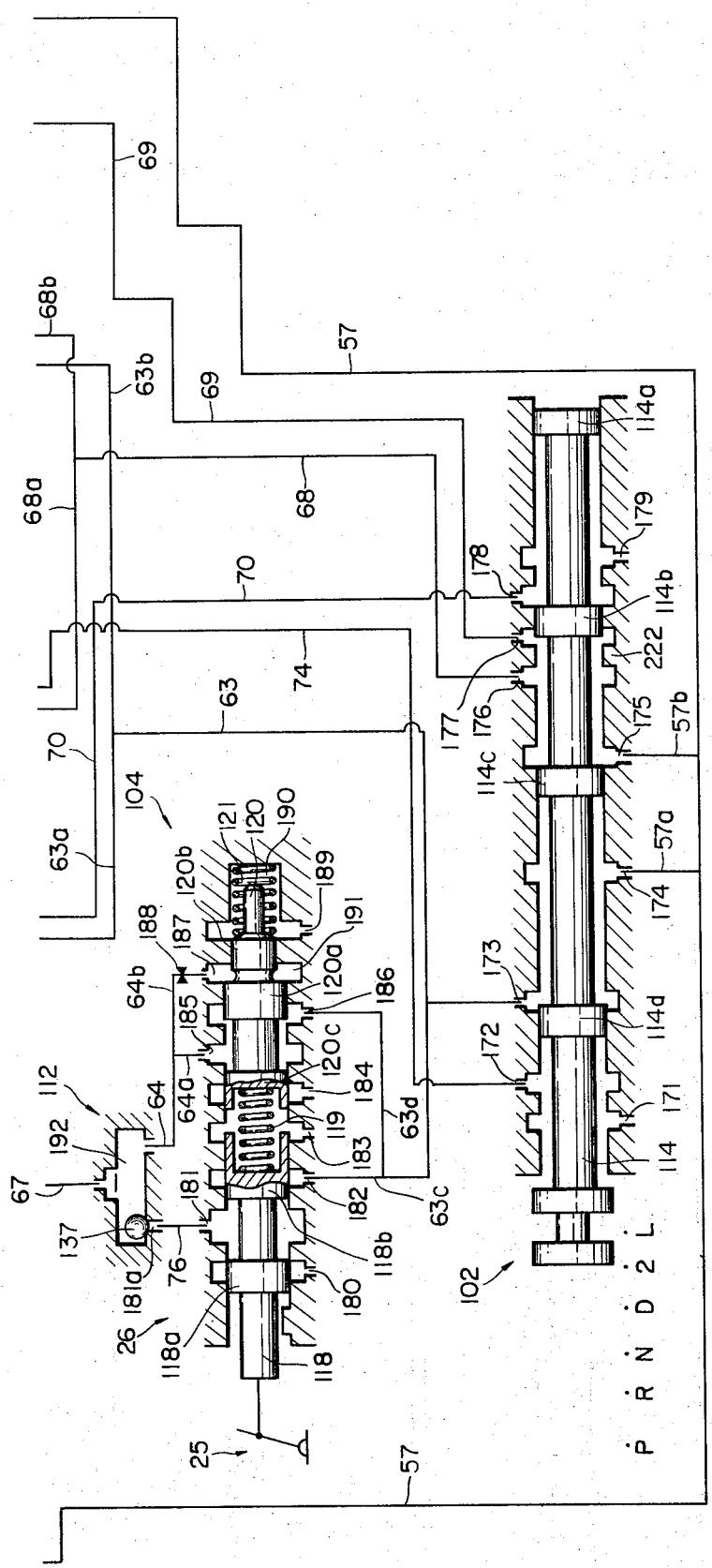

CONTROL SYSTEM FOR AUTOMATIC TRANSMISSION

BACKGROUND OF THE INVENTION

This invention relates generally to automatic power transmissions for motor vehicles and more specifically to a hydraulic control system for such transmissions.

Known automatic power transmissions for motor vehicles usually combine a hydrodynamic unit such as a torque converter and a gear transmission proper, providing one or several forward drive power trains and one reverse drive power train therethrough. It is also well known that planetary gearing can be advantageously incorporated in the majority of such automatic transmissions for its compactness and simplicity of operation. Further, there have been advocated varieties of systems for the control of such transmissions, and most of the known hydraulic control systems include some means or other for engaging and disengaging selective combinations of one or more hydraulic clutches and one or more hydraulic brakes.

In order to provide a plurality of different speed ratio power trains through a single automatic transmission, several friction engaging devices must be selectively operated. If, at the moment of transition from one speed ratio to another, different friction engaging devices required to establish the respective speed ratios are simultaneousl set in operation, the entire transmission will become locked, in effect, producing a no less violent jerking motion than that encountered upon overly rapid braking action. Should the friction engaging devices be both disengaged at the same time, on the other hand, the vehicle speed will not rise with the increase in engine r.p.m. even when the accelerator pedal of the vehicle is depressed. The operator will then experience an unpleasant sensation of idling of the engine. In order to avoid these undesirable outcomes, careful control is necessary over the process in which one friction engaging device is taken over by another.

SUMMARY OF THE INVENTION

It is, therefore, an important object of the present invention to provide a hydraulic control system for an automatic transmission designed to make possible smooth and jerk-free upshift and downshift transitions.

It is another important object of the invention to provide a hydraulic control system for an automatic transmission whereby two friction engaging devices adapted respectively for providing different speed ratios through the transmission are both temporarily held in sliding engagement, during a shift from one of the speed ratios to the other, in such a manner that uninterrupted torque transmission proceeds throughout the shift transition.

According to the present invention, briefly summarized, there is provided a control system for an automatic transmission of the type having at least two frictionally engageable means adapted for establishing a lower and a higher forward speed ratio power train therethrough, the control system comprising a source of fluid pressure, shift valve means for selectively engaging and disengaging the frictionally engageable means by fluid pressures supplied from the source in order to establish a desired power train, and modulator valve means disposed between the shift valve means and the frictionally engageable means for modulating the fluid pressures for engagement and disengagement of the frictionally engageable means in an interrelated manner whereby, for a shift from one forward speed ratio to another, the fluid pressure which has been causing engagement of one of the frictionally engageable means is adjusted to a value only slightly less than a predetermined value at which the said one frictionally engageable means begins to be disengaged at the instant when the fluid pressure supplied for engagement of the other of the frictionally engageable means is at a value only slightly less than a predetermined value at which the said other frictionally engageable means begins to be engaged, the values of the fluid pressures for engagement and disengagement of the respective frictionally engageable means being thereafter varied in inverse proportion to each other.

The above and other objects, features and advantages of this invention will be more fully apparent from the following detailed description taken in connection with the accompnaying drawings which illustrate some preferred forms of the automatic transmission control system of the invention, and in which like reference characters denote like parts throughout the several views.

BRIEF DESCRIPTION OF THE DRAWINGS

In the accompanying drawings:

FIGS. 4A through 4D are enlarged schematic diagrams which constitute in combination a more detailed representation of the control system of FIG. 3;

DETAILED DESCRIPTION

Figure 1:
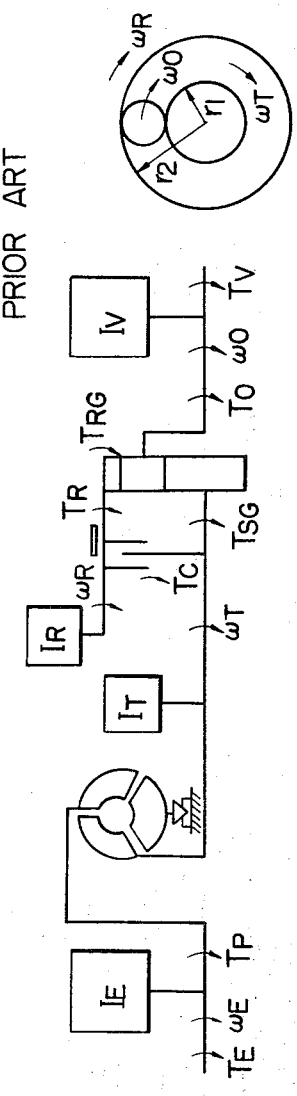
FIG. 1 is a schematic diagram showing the patternized configuration of a known automatic transmission by way of explanation of the detailed process of shift transition.

As is disclosed in "SAE Design Practice—Passenger Car ATM" or in "Testing Method for Automatic Transmission during Gear Change" published in the 13th convention of FISITA, the ratio changes of an automatic transmission proceed through the process of: Low Gear ⇌ Torque Phase (L) ⇌ Inertial Phase ⇌ Torque Phase (H) ⇌ High Gear. However, the torque phase (H) in case of upshifts and the torque phase (L) in case of downshifts may be absent. This process is hereinafter described in more detail with reference to FIG. 1 (it being well known that an automatic transmission can be represented in the form of the patternized configuration as in FIG. 1 for simplicity) to make clear the advantages and features of the present invention.

The process of ratio changes may be set forth in more specific terms as:

1. Low Gear

Clutch member released and reaction member fixed;

2. Torque Phase (L)
   Clutch member sliding and reaction member fixed;

3. Inertia Phase
   Both clutch member and reaction member sliding;

4. Torque Phase (H)
   Clutch member fixed and reaction member sliding; and

5. High Gear
   Clutch member fixed and reaction member released.

An upshift is carried out through the procedure of (1) through (5), and a downshift through the procedure of (5) through (1). As is well known, the jerks that often accompany ratio-changing operation are caused by the fluctuations in the torque output of the automatic transmission between the above phases. This torque output in each of the phases can be formulated as follows:

1. Low Gear ($Tc=0$, $\omega R = d\omega R/dt = 0$)

$$To=[R/1+(I_M/I_V) R^2] (trT_E+[I_M/I_V]RT_V)$$

2. Torque Phase (L) ($Tc=fc((t))$ $\omega R = d\omega R/dt = 0$)

$$To=[R/1+(I_M/I_V) R^2] (trT_E+(I_M/I_V) RT_V-Te)$$

3. Inertia Phase ($Tc=fc((t))$, $T_R=fR((t))$ )

$$To=[1/(R-1)^2+(I_R/I_V) R^2+(I_R/I_M)] [ (I_R/I_M) RtrT_E+(I_R/I_V) R^2T_V+R(R-1-[I_R/I_M])Tc+R(R-1)T_R]$$

4. Torque Phase (H) ($T_R=fR((t))$, $\omega r = \omega o = \omega R$)

$$To=[1/1+(I_M+I_R/I_V)](trT_E+[I_M+I_R/I_V] T_V+T_R)$$

5. High Gear ($T_R=0$, $\omega r=\omega o=\omega R$)

$$To=[1/1+(I_M+I_R/I_V)] (trT_E+[I_M+I_R/I_V]T_V)$$

where
$I$ = moment of inertia;
$I_M$ = equivalent moment of inertia = $Kt\ I_E+I_T$;
$R$ = gear ratio of the transmission = $(r_1+r_2)/r_1$;
$r_1$ = effective radius of the sun gear;
$r_2$ = effective radius of the ring gear;
$K$ = coefficient represented by $d\omega E/dt = K(d\omega T/dt)$;
$T$ = torque;
$t$ = time;
$t_r$ = torque ratio of the torque converter; and
$\omega$ = angular velocity;
and where the subscript letters following the above symbols respectively indicate the following parts:
$C$ = clutch member of the transmission;
$E$ = engine;
$R$ = reaction member of the transmission;
$T$ = turbine of the torque converter; and
$V$ = vehicle Furhter, $fc((t))$ and $fR,((t))$ are functions respectively representing the variation with the lapse of time of the torques acting on the clutch and reaction members which are sliding.

In the foregoing formulas, the moment of inertia $I_V$ of the vehicle has such a great value in comparison with the values of the other moments of inertia $I_M$ and $I_R$ that the terms having $I_V$ as the denominator can be considered zero for all practical purposes. Therefore, the above formulas may be rewritten as:

1. Low Gear $$To=RtrT_E$$

2. Torque Phase (L)

$$To=R(trT_ETc)$$

3. Inertia Phase $$To=[1/(R-1)^2 +(I_R/I_M) ] [(I_R/I_M)RtrT_E+R(R-1-[I_R/I_M]) Tc+R(R-1)TR']$$

4. Torque Phase (H)

$$To=trT_E+T_R$$

5. High Gear $$To=trT_E$$

If now the various technical data of the transmission are determined, $R$, $I_M$ and $I_R$ can be regarded as constants, so that $trT_E$, $T_R$ and $T_C$ are the only variables of the above simplified formulas. For smooth and jerk-free upshift or downshift transition, the fluctuations of the output torque To must be minimized. However, in the torque phase (L) or (H) at the start of an upshift or downshift, the output torque To will either increase or decrease when torque is produced by the clutch or brake that must be engaged but when the ratio change is not yet accomplished. Assuming that the vehicle toque $T_V$ remains approximately constant throughout the upshift or downshift operation (the vehicle torque $T_V$ under the normal traveling conditions of the vehicle can be considered unvarying during the short process of shift transition), this increase or decrease of the output torque To gives rise to corresponding fluctuations of the output shaft and jerks of the vehicle. In order to make the value of the output torque To constant throughout the above explained phases, the relative forces or pressures with which the relevant clutch and brake are engaged during ratio-changing operation must be controlled in conformity with the above presented formula for the inertia phase (3), as is made possible by the control system of this invention.

Figure 2:
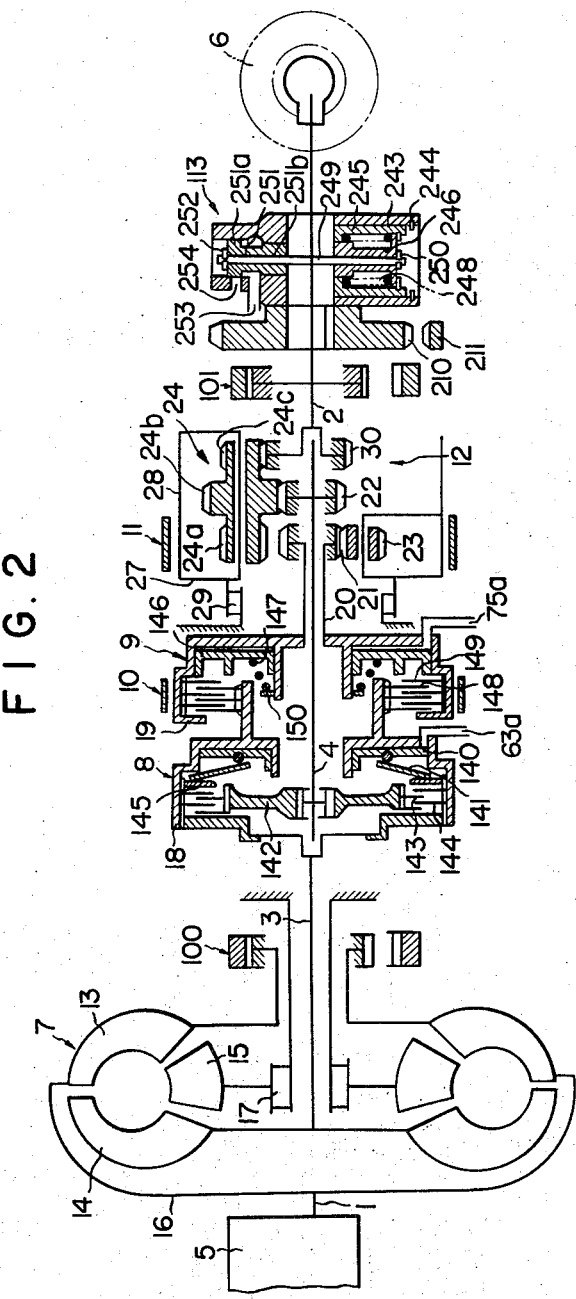
FIG. 2 is a schematic side view, in longitudinal section, of an automatic transmission suitable for use with the control system of the present invention.

The power transmission control system of the present invention is hereinafter described in terms of a preferred form thereof illustrated in FIGS. 2, 3, and 4. Referring first to FIG. 2, which illustrates an automotive power transmission to which are applicable the novel concepts of the invention, the transmission comprises a drive shaft 1, a driven shaft 2, and intermediate shafts 3 and 4. The drive shaft 1 may be, in fact, the crankshaft of the engine 5 of the vehicle, and the driven shaft 2 may be linked to the driving wheels 6 of the vehicle by any suitable power transmitting mechanism of known type. The intermediate shafts 3 and 4 are operatively disposed between the drive shaft 1 and the driven shaft 2 in a known manner.

The transmission further comprises a hydraulic torque converter 7, first and second hydraulically operated friction clutches 8 and 9, first and second hydraulically operated friction brakes 10 and 11, and a planetary gear set 12. The hydraulic torque converter 7 includes a pump impeller 13, a turbine runner 14, and a stator wheel 15. The pump impeller 13 is driven by the engine crankshaft or drive shaft 1 via a drive plate 16. The turbine runner 14 is splined to the intermediate shaft 3. The stator wheel 15 is supported by a one-way clutch 17 so as to be rotatable only in the direction of rotation of the pump impeller 13.

A drum 18 of the first friction clutch 8 is fixedly mounted on the intermediate shaft 3 for rotation therewith. Part of the clutch drum 18 serves as an inner hub of the second friction clutch 9. The inner hub 142 of the first friction clutch 8 is splined to the intermediate shaft 4. A sun gear 22 is also splined to the intermediate shaft 4 for rotation therewith. A drum 19 of the second friction clutch 9 is keyed to a sleeve 20, to which sleeve is splined another sun gear 21. As a result, the clutch drum 19, the sleeve 20 and the sun gear 21 are rotatable altogether.

Rotatably mounted on a carrier 27, planet gear means generally designated by numeral 24 integrally combines three planet gears 24a, 24b and 24c having different numbers of teeth on their peripheries. Another planet gear 23 is also rotatably supported by the planet gear carrier 27 to mesh with both the planet gear 24a and the sun gear 21. The planet gear carrier 27 is substantially integral with a brake drum 28, which drum is provided with a one-way clutch 29 so that the same is permitted to rotate only in the direction of rotation of the engine crankshaft or drive shaft 1.

The aforesaid planet gear 24b meshes with the sun gear 22, and the planet gear 24c meshes with still another sun gear 30 which is fixedly mounted on the driven shaft 2. The first and second friction brakes 10 and 11 (the numerals pointing to their friction bands) are adapted respectively to arrest the revolution of the clutch drum 19 (hence the sun gear 21) and of the brake drum 28 (hence the planet gear carrier 27).

Figure 3:
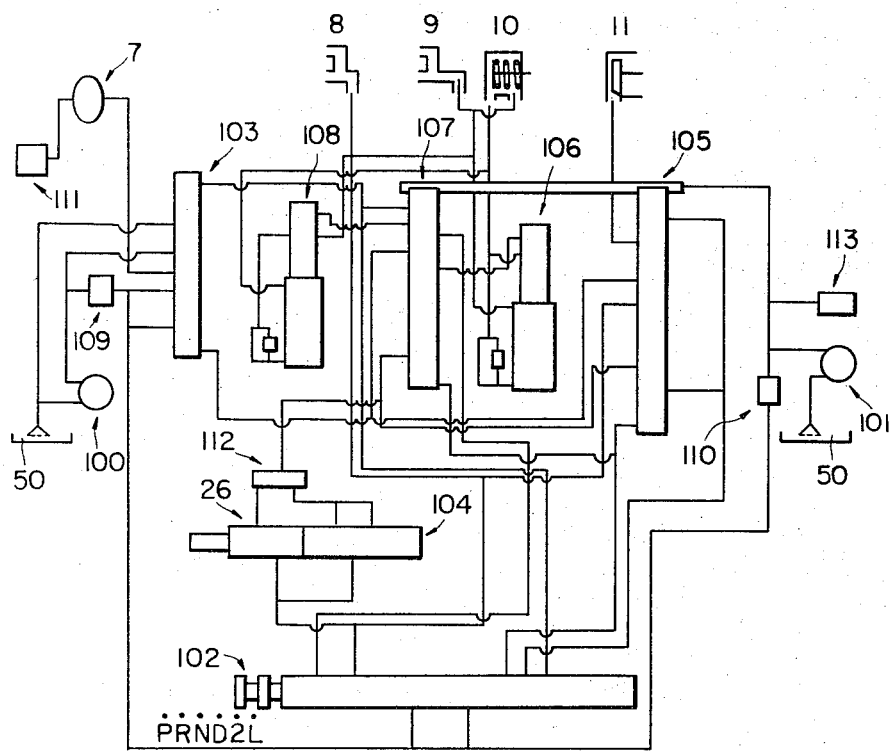
FIG. 3 is a schematic diagram of the complete control system for the automatic transmission in accordance with the invention.
Figure 4:
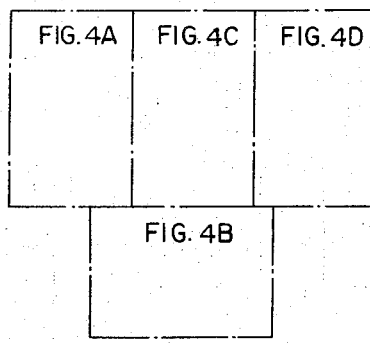
FIG. 4 is a reference diagram explanatory of the juxtapositional layout of FIGS. 4A, 4B, 4C and 4D.

A manual valve assembly 102 illustrated in FIG. 3 and in more detail in FIG. 4B has six operative positions: P, R, N, D, 2 and L. By moving this manual valve to the desired position, the transmission has a neutral condition in the N position, and provides a low speed ratio in the L position. When, however, the manual valve has been moved to this L position from the high speed ratio driving condition of the transmission, there will be first provided an intermediate speed ratio, and a low speed ratio will be succeedingly realized as the vehicle speed correspondingly decreases. With the manual valve in its 2 position, the transmission provides the low or intermediate speed ratio depending upon the vehicle speed and throttle opening. With the manual valve in its D position and with small throttle opening, automatic change is carried out from an intermediate to a high speed ratio and vice versa in step with the vehicle speed. With medium or full throttle opening, on the other hand, similarly automatic change is effected between low, intermediate and high speed ratios of the transmission in accordance with the vehicle speed. An intermediate speed ratio is provided when the vehicle is at rest with the manual valve in its D position. A reverse drive ratio is provided in the R position of the manual valve.

When the manual valve is moved to its P position by a selector lever, not shown, a pawl 211 of FIG. 2 engages the external teeth on a ring gear 210 keyed to the driven shaft 2 to lock the same against rotation as is well known in the art. Low speed forward drive is obtained only in the L and 2 positions of the manual valve and at low vehicle speed, or in the D position of the manual valve and at low vehicle speed and with medium or more throttle opening. If the manual valve is in the L position in the above instance, however, other speed ratios will not be provided unless the operator moves the selector lever.

Figure 4A:
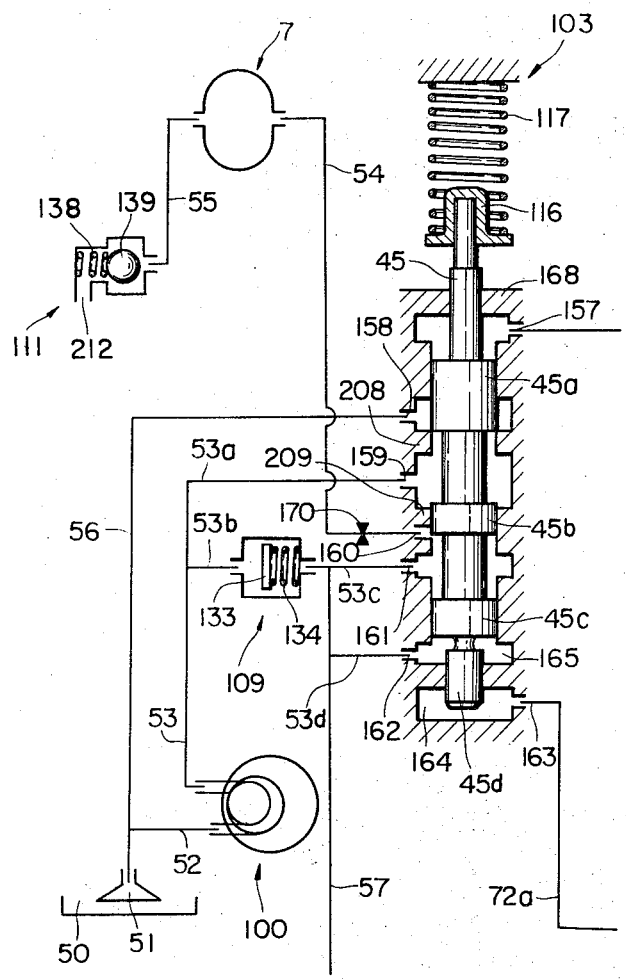
Figure 4D:
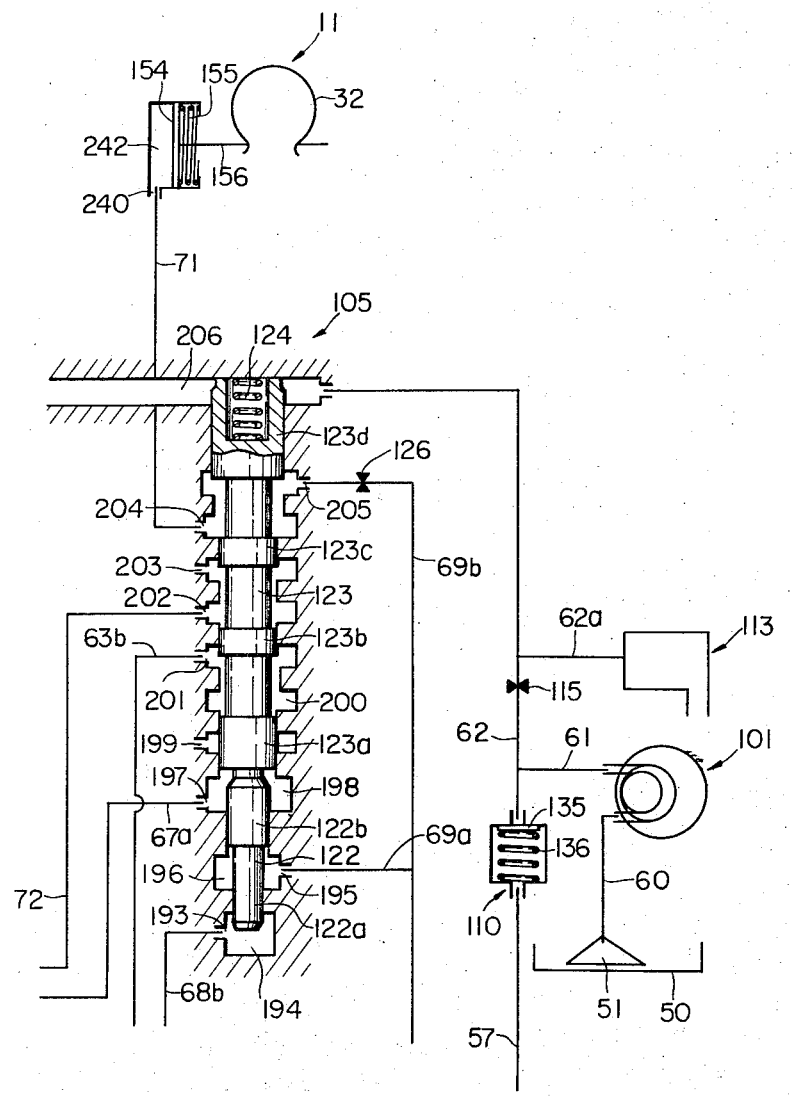
Figure 4C:
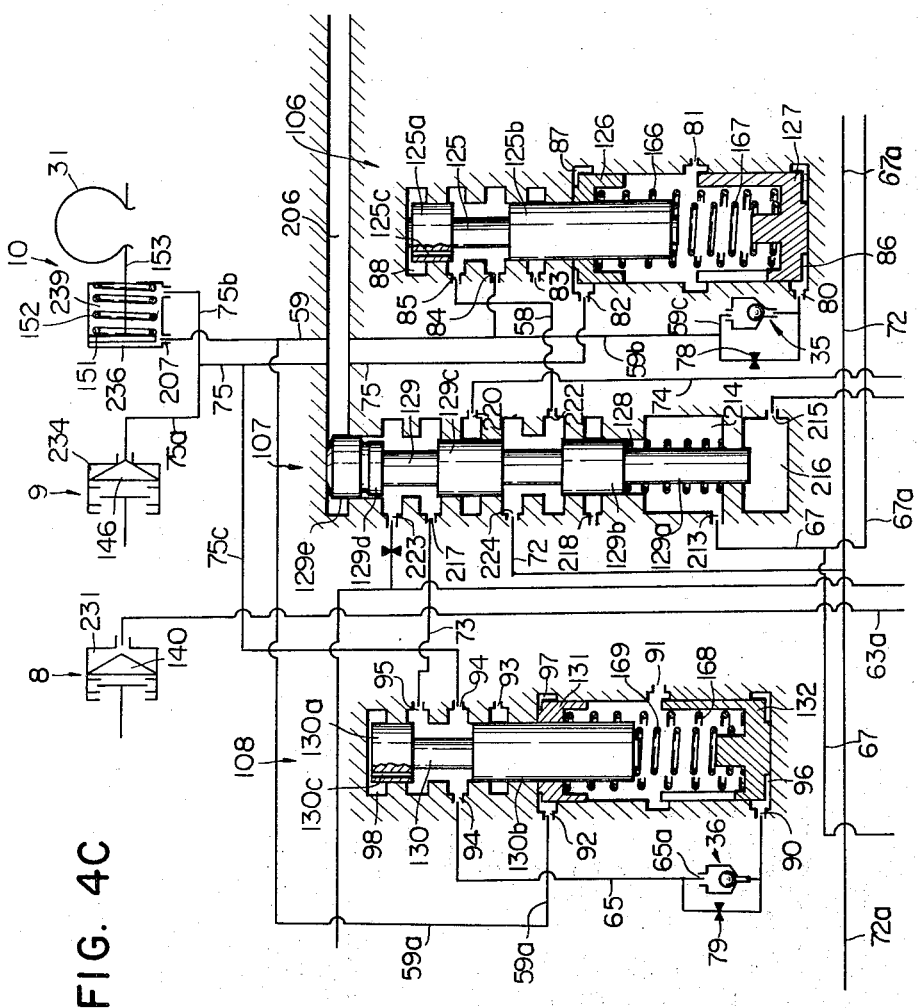

The low speed ratio in the L position of the manual valve is obtained by engaging the first friction clutch 8, by applying fluid pressure to a piston 140, FIG. 4C, and by engaging the second friction brake 11 by applying fluid pressure to a piston 154, FIG. 4D. Hence the so-called "two-way drive" is realized. The low speed ratio in the 2 and D positions of the manual valve, on the other hand, is obtained only by engaging the first friction clutch 8 by applying fluid pressure to the piston 140, the function of the second friction brake 11 being performed by the one-way clutch 29. Hence the "one-way drive" is realized.

The one-way clutch 29 has additional functions as set forth hereinbelow. When the manual valve is moved from its L to 2 or D position following the start-up of the vehicle, the second friction brake 11 which has been providing a low speed ratio is released, followed by the engagement of the first friction brake 10 or of the second friction clutch 9 to provide an intermediate or a high spped ratio through the transmission. If, in this instance, the second friction brake 11 is released before proper engagement of the first friction brake 10 or of the second friction clutch 9, the revolving speed of the engine crankshaft or transmission drive shaft 1 will increase to such an extent that a violent jerk occurs upon engagement of the first friction brake 10 or the second friction clutch 9. In order to avoid this, the one-way clutch 29 becomes operative upon disengagement of the second friction brake 11 to prevent engine acceleration until the first friction brake 10 or the second friction clutch 9 is properly engaged.

In this manner, the one-way clutch 29 operates to prevent rotation of the planet gear carrier 27 in the direction opposite to that of engine rotation for the low speed ratio. Upon engagement of the first friction brake 10 or of the second friction clutch 9, the planet gear carrier begins to rotate in the forward direction or in the same direction as the engine rotation. The one-way clutch 29 is succeedingly automatically disengaged at the proper time to permit a smooth shift from low to intermediate or high speed ratio.

To provide the low speed power train through the transmission, the first friction clutch 8 operates to connect the intermediate shaft 3 to the intermediate shaft 4, and the sun gear 22 is driven as a driving element of the planetary gear set 12. The drive is transmitted through the planet gears 24b and 24c from the sun gear 22 to the sun gear 30, thus driving the driven shaft 2 at a reduced speed with respect to the intermediate shaft 4. Since torque conversion takes place in both the hydraulic torque converter 7 and the planetary gear set 12, the torque with which the shaft 2 is driven is the product of the individual torque multiplications of the hydraulic torque converter 7 and the planetary gear set 12.

The intermediate speed power train is established by allowing the first friction clutch 8 to remain engaged, by releasing the second friction brake 11, and by engaging the first friction brake 10. Although the flow of power for the intermediate speed power train is the same as for the low speed power train, the sun gear 21 in this latter instance is the reaction element of the planetary gear set 12 rather than the planet gear carrier 27 because the sun gear 21 is now held stationary by the first friction brake 10.

The sun gear 22, rotatable with the intermediate shafts 3 and 4, and the sun gear 30 rotatable with the driven shaft 2 are in mesh with the integrally combined planet gears 24b and 24c, respectively, of the planet gear means 24, while the other planet gear 24a of the planet gear means 24 is in mesh with the planet gear 23 supported by the carrier 27, the planet gear 23 being in mesh also with the sun gear 21. Since now this sun gear 21 is held stationary by the first friction brake 10, the planet gear carrier 27 rotates in the forward direction. Accordingly, the sun gear 30 and therefore the shaft 2 are driven at a reduced speed with respect to the intermediate shaft 4 which, however, is higher than for the low speed drive.

The intermediate speed ratio will be completed when the manual valve is moved to the 2 or D position within a certain range of vehicle speed and of throttle opening, or when the manual valve is manually shifted to the L position from the high speed ratio driving condition of the transmission. In any of the L, 2 and D positions of the manual valve, the transmission will provide the low speed ratio as the vehicle speed succeedingly decreases. Although the transmission may shift to the intermediate speed ratio with increase in the vehicle speed in the 2 or D positions of the manual valve, a shift to the intermediate or high speed ratio is not possible when the manual valve is in the L position.

The high speed power train will be completed when the manual valve is in the D position and when the vehicle speed is sufficiently high. The high speed power train is obtained by allowing the first friction clutch 8 to remain engaged, by releasing the first friction brake 10 or the second friction brake 11, and by engaging the second friction clutch 9. This second clutch may be engaged by applying fluid pressure to its piston 146. In this drive, too, as in the above described cases of the low and intermediate speed drives, the intermediate shaft 3 drives the sun gear 22 through the first friction clutch 8. The second friction clutch 9 functions to connect the first clutch drum 18, which is connected to the intermediate shaft 3, to the sun gear 21 through the second clutch drum 19.

In this manner both the sun gears 21 and 22 are driven by the intermediate shaft 3. As is well known in connection with the planetary gear set, when two elements thereof are driven at the same speed, the gear set becomes locked, so that all of its elements rotate as a unit. There is thus a direct drive between the intermediate shaft 3 and the driven shaft 2. Since the hydraulic torque converter 7 in this case may be considered to function as a simple fluid coupling, there exists a susbstantial direct drive between the drive shaft 1 and driven shaft 2 of the transmission.

Reverse drive may be obtained through the transmission by engaging the second friction clutch 9 and the second friction brake 11. The power train for this drive extends from the drive shaft 1 through the torque converter 7, the intermediate shaft 3, the second friction clutch 9, the sun gear 21, the planet gear 23, the planet gears 24a and 24c of the planet gear means 24, and the sun gear 30 to the driven shaft 2. The engaged second friction brake 11 causes the planet gear carrier to operate 27 as the reaction element of the planetary gear set 12, the reaction on the carrier 27 being exerted in the forward direction.

Since there are two planet gears 23 and 24 between the sun gear 21 which drives and the sun gear 30 which is driven, the sun gear 30 and therefore the shaft 2 will be driven at a reduced speed in the reverse direction with respect to the intermediate shaft 3. For this reverse drive, the hydraulic torque converter 7 generally functions to increase torque, so that the torque imparted to the driven shaft 2 is the product of the torque increases by the torque converter 7 and the planetary gear set 12.

The neutral condition of the transmission, in which the manual valve is in the N position, is completed when the friction clutches 8 and 9 and the friction brakes 10 and 11 are all disengaged.

As best illustrated in FIG. 4C, the first friction brake 10 is engaged when fluid pressure is delivered to an actuating chamber 236 on one side of a piston 151 to press a strut 153 connected to one end of the brake band 31. A spring 152 is housed in a releasing chamber 239 on the opposite side of the piston 151 tending to hold it in its brake releasing position. Upon application of fluid pressure to this releasing chamber 239, the spring 152 presses the piston 151 against the fluid pressure within the chamber 236 to release the brake 10.

Similarly, in the second friction brake 11 shown in FIG. 4D, a piston 154 moves against a spring 155 upon application of fluid pressure to an actuating chamber 242, thereby causing a strut 156 to engage the brake band 32.

The automotive power transmission for use with the control system of this invention will be apparent from the foregoing description set forth in connection with FIG. 2 in particular.

As illustrated schematically in FIG. 3, the control system for the transmission generally comprises a front pump 100, a rear pump 101, the manual valve 102, a pressure regulator valve 103, a 1–2 shift valve 105, a first modulator valve 106, a 2–3 shift valve 107, a second modulator valve 108, check valves 109 and 110, and a governor valve 113. The pumps 100 and 101 may be of any suitable fixed displacement type and may be of the internal-external gear type.

With reference to FIG. 4A in particular, the front pump 100 draws fluid from a sump 50 through a filter 51 and an inlet conduit 52 and discharges it into an outlet conduit 53. The pump 100 is driven directly from the drive shaft 1 through the pump impeller 13 shown in FIG. 2. The rear pump 101 shown in FIG. 4D draws fluid from the sump 50 through the filter 51 and an inlet conduit 60 and discharges it into an outlet conduit 61. This rear pump is driven from the driven shaft 2 of the transmission.

A conduit 57 is adapted for the supply of line pressure to the various friction clutches and brakes in order to complete a desired power train through the transmission. A check valve 110, FIG. 4D, is positioned between the line pressure conduit 57 and the outlet conduit 61 of the rear pump 101 and comprises a piston 135 yieldingly held in its closed position by means of a spring 136. The check valve 110 blocks fluid flow from the conduit 57 to the conduit 61 and the rear pump 101.

A similar check valve 109, FIG. 4A, comprising a piston 133 and a spring 134, is positioned between the line pressure conduit 57 and the outlet conduit 53 for the front pump 100. The pressure regulator valve 103 shown in the same drawing functions to regulate pressure in the line pressure conduit 57. The valve 103 comprises a piston 45 having lands 45a, 45b and 45c of equal diameter and another land 45d of smaller diameter. A spring 117 is provided for moving the piston 45 downwardly through a member 116. The valve 103 further comprises ports 157, 158, 159, 160, 161, 162 and 163. The ports 161 and 162 communicate with the line pressure conduit 57. The port 159 communicates with the outlet conduit 53 of the front pump 100 through a conduit 53a. The port 158 communicates with the inlet conduit 52 of the pump 100 through a conduit 56. The port 160, having an orifice 170, communicates with the torque converter 7 through a conduit 54. Any desired fluid pressure may be delivered to the torque converter 7 if the size of the orifice 170 is suitably determined.

The governor valve 113 shown in FIG. 2 produces a speed responsive fluid pressure to cause various ratio changes in the transmission. The governor valve 113 comprises a casing 243 fixedly mounted on the driven shaft 2, a piston 251 slidably disposed within a cavity in the casing 243, an internal weight 246, an external weight 245, and a spring 248 effectively extending between the governor weights 245 and 246. A strut 249 having rings 252 and 250 on both ends thereof is provided to prevent outward displacement of the weights 245 and 246 and the valve piston 251. The valve piston 251 has lands 251a and 251b having different axial lengths. The casing 243 has ports 253 and 254. The port 253 communicates with the outlet conduit 61 of the rear pump 101 through a conduit 62a and a conduit 62 having an orifice 115, as seen in FIG. 4D. The port 254 communicates with the sump 50.

The throttle valve 104 produces a pressure which varies with the position of the accelerator of the vehicle for varying the shift points of the transmission. The throttle valve 104 is under the control of the downshift valve 26. As illustrated in detail in FIG. 4B, the downshift valve 26 includes a valve piston 118 having lands 118a and 118b, and also comprises ports 180, 181 and 182. The port 182 communicates with the port 173 of the manual valve 102 through conduits 63c and 63. The port 180 is a discharge port. The port 181 communicates with the port 181a of a check valve 112 and, through its valve chamber 192, with the port 213 of the 2–3 shift valve 107 through the conduit 67 and also with the port 197 of the 1–2 shift valve 105 through a conduit 67a. The piston 118 of the downshift valve 26 is under the control of the accelerator pedal 25 of the vehicle by any suitable linkage mechanism, so that when the accelerator pedal 25 is moved toward an open throttle position, it moves the valve piston 118 to the right as viewed in FIG. 4B. It will be understood that the accelerator pedal 25 has the known connections with the carburetor of the vehicle engine 5.

Also as illustrated in FIG. 4B, the throttle valve 104 comprises a piston 120 having lands 120a, 120b and 120c. The valve 104 has ports 183, 184, 185, 186, 187 and 189. A spring 119 is positioned between the valve pistons 118 and 120, and another spring 121 is positioned on the right hand side, as viewed in FIG. 4B, of the valve piston 120. The ports 183, 184 and 189 are provided for the discharge of fluid. The port 186 communicates with the port 173 of the manual valve 102 through conduits 63d and 63. The port 185 communicates with the port 187 through conduits 64a and 64b having an orifice 188. These conduits 64a and 64b communicate with the chamber 192 of the check valve 112 having a check ball 137 and thence with the chamber 214 of the 2–3 shift valve 107 through the conduit 67 and the port 213 and also with the chamber 198 of the 1–2 shift valve 105 through the conduit 67a.

The 2–3 shift valve 107, adapted for causing engagement and disengagement of the proper friction clutch and brake to cause changes between second and third speed drives, comprises a piston 129 and a spring 128 for yieldingly moving the piston 129 upwardly as seen in FIG. 4C. The valve piston 129 has lands 129c and 129d of equal diameter, a land 129e of greater diameter than the lands 129c and 129d, a land 129b of smaller diameter than the lands 129c and 129d, and a groove 129a.

The valve 107 further comprises ports 213, 215, 217, 218, 220, 222, 223 and 224 and chambers 206, 214 and 216. The port 218 is a discharge port in communication with the sump 50. The port 213 communicates with the ports 185 and 187 of the throttle valve 104 through the conduit 67, the check valve 112 and the conduits 64, 64a and 64b. The port 215 communicates with the port 176 of the manual valve 102 through the conduits 68 and 68a. The port 217 communciates through a conduit 73 with the port 95 of a second modulator valve 108 hereinafter referred to. The port 220 communicates with the port 172 of the manual valve 102 through a conduit 74. The port 222 communicates through a conduit 58 with the port 84 of a first modulator valve 106 hereinafter referred to. The port 223 communicates with the port 178 of the manual valve 102 through a conduit 70 and also with the port 157 of the pressure regulator valve 103 through a conduit 70a. The port 224 communicates through a conduit 72 with the port 202 of the 1–2 shift valve 105 hereinafter described in more detail.

The 1–2 shift valve 105, shown in FIG. 4D, causes changes between first and second speed drives by releasing the second friction brake 11 when the first friction brake 10 is engaged and by releasing the first brake 10 for engagement of the second brake 11. The valve 105 comprises a piston or plug 122 having a groove 122a and a land 122b. The valve 105 also comprises a piston 123 having a land 123a, lands 123b and 123c of equal diameter greater than the diameter of the land 123a, and a land 123d of still greater diameter. The land 122b of the piston 122 has a smaller diameter than the land 123a of the piston 123.

A spring 124 is disposed between a stationary part of the valve 105 and the land 123d to urge the piston 123 downwardly as viewed in FIG. 3D. The 1–2 shift valve 105 further comprises ports 193, 195, 197, 199, 201, 202, 203, 204 and 205 and chambers 194, 196, 198, 200 and 206. The ports 199 and 203 are bleed ports in communication with the sump 50. The port 193 communicates with the port 176 of the manual value 102 through the conduits 68b and 68. The ports 195 and 205 are intercommunicated by conduits 69a and 69b and also communicates with the port 177 of the manual valve 102 through the conduit 69. The port 197 communicates through the conduits 67a and 67 with the port 213 of the 2–3 shift valve 107 and also with the outlet conduit 64 of the throttle valve 104. The chamber 200 is formed only to facilitate boring operation of the valve 105. The port 201 communicates with the port 173 of the manual valve 102 through the conduits 63b and 63. The conduit 63 is further connected to conduits 63a, 63c and 63d for communication with the actuating chamber 231 of the first friction clutch 8, as seen in FIG. 4C, and with the port 182 of the downshift valve 26 and the port 186 of the throttle valve 104. The port 202 communicates with the port 224 of the 2–3 shift valve 107 through the conduit 72 and further with the port 163 of the pressure regulator valve 103 through the conduit 72a. The port 204 communicates through a conduit 71 to the port 240 open to the actuating chamber 242 of the second friction brake 11.

The first modulator valve 106, shown in FIG. 4C, comprises a piston 125 having lands 125a and 125b of equal diameter, a second piston 127 below the first mentioned piston 125, a third piston 126 pressure-tightly but slidably fitted over the land 125b of the first piston 125, a first spring 167 extending between the first piston 125 and the second piston 127, and a second spring 166 extending between the second piston 127 and the third piston 126. The valve 106 further comprises ports 80, 81, 82, 83, 84 and 85 and chambers 86, 87 and 88. The ports 81 and 83 are bleed ports. The port 80 communicates with the port 84 through conduit 59b and further with the port 207 open to the actuating chamber 236 of the first friction brake 10 through conduit 59.

This conduit 59 also leads through its branch 59a to a port 92 open to the chamber 97 of the second modulator valve 108 hereinafter described in more detail. The conduit 59b has an orifice 78 and a bypass 59c therefor, the bypass 59c having a first one-way valve 35 adapted to permit the flow of fluid only from the port 80 to the port 84. The port 82 communicates with the actuating chamber 234 of the second friction clutch 9 through conduits 75 and 75a, with the releasing chamber 239 of the first friction brake 10 through conduits 75 and 75b, and with the port 94 of the second modulator valve 108 through conduits 75 and 75c. The port 85 communicates with the port 222 of the 2–3 shift valve 107 through conduit 58. An orifice 125c extends through the land 125a of the first piston 125 to communicate the chamber 88 with the grooved portion between the lands 125a and 125b. This orifice 125c is provided purely for the purpose of preventing the first piston 125 from vibrating during pressure regulating operation, so that the bore of the orifice 125c may be sufficiently greater than that of the orifice 78 of the conduit 59b.

The second modulator valve 108, shown also in FIG. 4C, is constructed in exact accordance with the first modulator valve 106, except for the arrangement of its ports and their connections. These, however, are already set forth in connection with the first modulator valve 106 so that no more explanation of the second modulator valve is considered necessary.

Proceeding to the description of a mode of operation of the above configured control system according to this invention, the pressure regulator valve 103 functions for all conditions of the transmission and its control system to regulate the line pressure in the conduit 57 and the other conduits communicated therewith to predetermined maximum values. When the vehicle is moving at low speed or is standing with the engine running, the front pump 100 supplies fluid pressure to the pressure regulator valve 103 and other elements of the system. The check valve 109 is held open by the fluid pressure in the conduit 53b, while the check valve 110 is held closed by the fluid pressure in the conduit 57, so that fluid cannot escape through the rear pump 101.

When the vehicle begins to move or increases its speed up to a certain level, the rear pump 101 begins its pumping action until the pressure of the fluid discharged thereby overcomes the spring 136 and the force of line pressure. Thus, the check valve 110 opens, and the line pressure delivered by the rear pump 101 closes the other check valve 109. The rear pump 101 now becomes the sole source of line pressure in the conduit 57.

The fluid delivered by the front pump 100 flows through the closed circuit formed by the conduit 53 and 53a, the ports 159 and 158 of the valve 103, the conduit 56, and the inlet conduit 52 of the front pump 100. The pressure regulator valve 103 regulates the pressure of the fluid supplied by the front pump 100 between the upper edge of its step 208 and the lower edge of the piston land 45a. The pressure of the fluid supplied by the rear pump 101 is regulated between the upper edge of the step 209 of the pressure regulator valve 103 and the lower edge of its piston land 45b. Accordingly, the thus-regulated fluid pressure of the rear pump 101 is slightly higher than the regulated fluid pressure of the front pump 100.

A fluid pressure made lower than the line pressure by the orifice 170 provided to the port 160 of the pressure regulator valve 103 is fed to the torque converter 7 through the conduit 54. The conduit 55 communicates the torque converter 7 with a check valve 111 for the lubrication circuit of the transmission, the check valve 111 functioning to keep constant the fluid pressure in the torque converter 7. The ball 139 of this check valve is urged by a spring 138 to keep the conduit 55 normally closed. The port 212 of the check valve 111 communicates with the various movable parts of the transmission for lubrication purposes.

For low speed, neutral and parking conditions of the transmission, the pressure regulator valve 103 regulates the line pressure in a condition where the fluid pressure exerted to the difference between the effective areas of the piston lands 45c and 45d is balanced with the force of the spring 117. For intermediate and high speed drives, since then the fluid pressure is supplied to the chamber 164 of the pressure regulator valve 103 from the port 202 of the 1–2 shift valve 105 through the conduit 72 and 72a, the line pressure is regulated by the valve 103 in a condition where the fluid pressure exerted to the difference between the effective areas of the piston lands 45c and 45d is balanced with the force of the spring 117. The thus-regulated line pressure will be lower than that for the low speed drive.

For reverse drive the manual valve 102 discommunicates the conduit 72 from the line pressure conduit 57. The line pressure in the chamber 164 of the valve 103 is discharged therefrom, while fluid pressure is supplied to its chamber 168 through the conduit 70. Thus, the fluid pressure exerted to the difference between the effective areas of the piston lands 45c and 45d becomes balanced with the resultant of the force of the spring 117 and the line pressure in the chamber 168, so that the line pressure in this case is higher than for the low speed forward drive.

The high line pressure for the low speed drive is necessary for the various friction engaging drvices so that the transmission will be capable of transmitting the high torque output of the engine at the high ratio of speed reduction. However, as the vehicle gains speed, the governor pressure from the governor valve 113 increases to move the piston 123 of the 1–2 shift valve 105 to its high-speed position, with the result that the line pressure is supplied to the chamber 164 of the pressure regulator valve 103. The resultant reduction in the line pressure is desirable because, as the vehicle gains speed, the torque required to be transmitted by the transmission grows less and the high line pressure is unnecessary.

The high line pressure for the reverse drive is also necessary because then the reaction member of the planetary gear set is subject to the force in the opposite direction to that for the forward drives and because the maximum ratio of speed reduction is provided for the reverse drive. The governor valve 113 produces an output pressure, or the governor pressure, that varies gradually with the changing centrifugal forces of its weights 245 and 246 and piston 251. For all forward drives, the rear pump 101 delivers fluid pressure to the port 253 of the governor valve 113 through the orifice 115 and the conduits 62 and 62a. The casing 243 of the governor valve 113 rotates with the driven shaft 2, and while the vehicle speed is low, a fluid pressure in accordance with the difference between the centrifugal force of the weights 246 and 245 and valve piston 251 is exerted to the difference between the effective areas of the piston lands 251a and 251b. This fluid pressure increases with the increase in speed of the driven shaft 2.

As the vehicle gains speed, the external weight 245 is centrifugally displaced further outwardly until it is stopped by the snap ring 244, so that now the fluid pressure applied to the valve piston 251 is under the influence of the centrifugal force of the internal weight 246 and the force of the spring 248 compressed by the displacement of the external weight 245. In this manner the centrifugal force of the weights 245 and 246 varies in two steps and the governor pressure varies correspondingly.

The accelerator pedal 25 acts on the throttle valve piston 120 through the downshift valve piston 118 to provide a throttle pressure in the conduit 64 which is less than the line pressure in the conduit 57 and which increases from almost zero at closed throttle to the line pressure at open throttle. The line pressure is supplied to the throttle valve 104 through the conduits 63 and 63d, and there is produced in the chamber 191 and its left-hand side chamber a fluid pressure corresponding to the difference between the forces of the springs 119 and 121. This fluid pressure is fed out to the throttle pressure conduit 64 through the port 185. The throttle pressure from the conduit 64 is supplied to the chamber 198 of the 1–2 shift valve 105 and to the chamber 214 of the 2–3 shift valve 107. The orifice 188 is provided for preventing the vibrations of the throttle valve 121.

The operation of the transmission control system according to this invention is hereinafter set forth for each range of operation.

NEUTRAL

When the selector lever is moved by the operator to shift the manual valve 102 to the N position, the line pressure supplied through the conduits 57, 57a and 57b and the ports 174 and 175 of the manual valve is blocked by its piston lands 114b and 114c. At this time, no fluid pressure is admitted to any of the other valves or the actuating mechanisms of the friction engaging devices and the transmission is in its netural condition.

L Range

When the L position of the manual valve 102 is obtained by moving the selector lever, the line pressure in the conduit 57 is admitted through the port 175 of the manual valve 102, between its piston lands 114b and 114c, to the ports 176 and 177. The line pressure is similarly admitted through the port 174, between the piston lands 114c and 114d, to the port 173. The line pressure from the port 176 is supplied, on the one hand, to the chamber 194 of the 1–2 shift valve 105 through the conduit 68 and 68b and, on the other hand, to the chamber 216 of the 2–3 shift valve 107 through the conduits 68 and 68a to hold the valve piston 129 in its low-speed position.

The line pressure from the port 177 is supplied to the chamber 196 of the 1–2 shift valve 105 through the conduits 69 and 69a and to the port 205 of the valve 105 through the conduits 69 and 69b. The fluid pressures in the chambers 194 and 196 cause the valve pistons 122 and 123 to move upwardly to their L position against the spring 124. By this upward displacement of the valve piston 123, the port 205 is communicated with the port 204 so that the line pressure is admitted to the actuating chamber 242 of the second friction brake 11.

The line pressure from the port 173 of the manual valve 102 is admitted to the actuating chamber 231 of the first friction clutch 8 through the conduits 63 and 63a and to the port 201 of the 1–2 shift valve 105 through the conduits 63 and 63b to be blocked by the lands 123a and 123b of the valve piston 123. The line pressure admitted to the port 182 of the downshift valve 26 through the conduits 63 and 63c is normally blocked by its piston land 118b (the port 182 communicates with the port 181 upon kickdown operation). The line pressure from the port 173 of the manual valve is also admitted into the throttle valve 104 through the conduits 63 and 63d and the port 186 and thence into the throttle pressure conduit 64 through the port 185.

This throttle pressure is admitted through the check valve 112 and the conduit 67 into the chamber 214 of the 2–3 shift valve 107, where the pressure cooperates with the line pressure in the chamber 216 to hold the valve piston 129 in its low speed position against the governor pressure in the chamber 206. The throttle pressure is also admitted through the conduits 67 and 67a to the chamber 198 of the 1–2 shift valve 105, where the pressure cooperates with the line pressure in the chambers 194 and 196 and the line pressure applied to the difference between the effective areas of the piston lands 123c and 123d to hold the pistons 123 and 122 in the low speed positions.

Thus, the first friction clutch 8 and the second friction brake 11 are engaged, holding the planet gear carrier 27 stationary and causing the sun gear 22 to function as the input element, and the transmission provides its low or first speed ratio. The one-way clutch 29 holds the planet gear carrier 27 stationary in one direction (the direction of the reactive force applied to the carrier 27 during the low speed drive), but it is permitted to rotate freely in the opposite direction. Since the second friction brake 11 completely holds the carrier 27 stationary, a two-way drive is provided. This is necessary to obtain the desired engine braking effect when operating in the L range.

The pistons 123 and 122 of the 1–2 shift valve 105 are held in their low speed positions due to the differential areas of the piston lands 123d and 123c and the fluid pressures admitted into the chambers 198, 196 and 194. These valve pistons are retained in the low speed positions regardless of the value of the governor pressure in the chamber 206 tending to move these valve pistons to their high speed positions. Thus, the transmission will remain in the first speed or low ratio until the manual valve 102 is moved out of the L position by the selector lever.

2 RANGE

When the manual valve 102 is shifted to its 2 position by the selector lever, the land 114b of the manual valve piston 114 moves to the step 222 between the ports 176 and 177, so that the port 175 does not communicate with the port 177. The condition of the hydraulic circuit in this case is thus substantially the same as that for the L range discussed previously, except for the absence of the line pressure from the conduits 69, 69a and 69b. Since now no line pressure is applied to the chamber 196 of the 1–2 shift valve 105 and to the difference between the effective areas of its piston lands 123c and 123d, the vehicle begins to gain speed.

The resultant increase in the governor pressure in the chamber 206 causes the 1–2 shift valve pistons 122 and 123 to move downwardly in FIG. 4D to their high speed positions. At this time the line pressure from the port 201, which has been blocked by the piston lands 123a and 123b, is permitted to flow between the piston lands 123b and 123c to the port 202 and thence to the port 224 of the 2–3 shift valve 107 through the conduit 72, and also to the port 163 of the pressure regulator valve 103 through the conduits 72a to reduce the value of the line pressure regulated by the valve 103.

The line pressure admitted as aforesaid to the port 224 of the 2–3 shift valve 107 is directed between its piston lands 129b and 129c to the port 222 and thence to the port 85 of the first modulator valve 106 through the conduit 58, because then the 2–3 shift valve piston 129 is held in its upward or low speed position by the fluid pressures in the chambers 214 and 216. The line pressure admitted into the first modulator valve 106 through its port 85 is supplied, on the one hand, into the chamber 88 through the orifice 125c and, on the other hand, into the port 84 and thence into the actuating chamber 236 of the first friction brake 10 through the conduit 59. The fluid pressure supplied from the port 84 is also directed into the chamber 97 of the second modulator valve 108 through the conduits 59 and 59a to depress its third piston 131 against the second spring 168. The fluid pressure from the port 84 is also supplied to the chamber 86 of the first modulator valve 106 through the conduit 59b having the orifice 78 and the port 80.

In this manner, with the increase in the fluid pressure in the actuating chamber 236 of the first friction brake 10 and in the chamber 97 of the second modulator valve 108 (hereinafter referred to more simply as the fluid pressure in the chamber 236 of the first brake 10), the fluid pressure in the chamber 88 of the first modulator valve 106 also rises to move the valve piston 125 downwardly in FIG. 4C against the spring 167, thereby disconnecting the port 85 from the port 84 and communicating the port 84 with the bleed port 83 to reduce the fluid pressure in the chamber 236 of the first brake 10. Since the fluid pressure in the chamber 88 of the first modulator valve 106 decreases with the reduction in the fluid pressure of the chamber 236 of the first brake 10, the first modulator valve piston 125 is returned by the spring 167 to its upward position in FIG. 4C so that the port 85 is again communicated with the port 84 while the port 84 is disconnected from the bleed port 83. Thus, the fluid pressure in the chamber 88 and therefore of the chamber 236 of the first brake 10 is modulated to a value corresponding to the force of the spring 167.

Since the chamber 86 of the first modulator valve 106 is supplied with the fluid pressure from the chamber 236 of the first brake 10 through the orifice 78, the fluid pressure in this chamber 86 will gradually rise to such a level that the second piston 127 moves upwardly against the springs 166 and 167, so that the modulated pressure of the first modulator valve 106 gradually rises with the increase in the fluid pressure in the chamber 86. In other words, the fluid pressure in the chamber 236 of the first brake 10 rises rapidly to the initial output pressure of the first modulator valve 106 uneil the brake 10 begins to be engaged.

Thereafter, by virtue of the orifice 78, the fluid pressure in the brake chamber 236 graudually rises to engage the brake 10, until finally it becomes equal in value to the line pressure at that instant. When the vehicle speed is sufficiently low, therefore, the line pressure is supplied to the first friction clutch 8 only, and the one-way clutch 29 operates to provide the first speed or low ratio. As the vehicle gains speed so that the 1–2 shift valve 105 moves to its high speed position, the graudally rising line pressure is supplied as previously mentioned to the actuating chambers 231 and 236 of the first friction clutch 8 and the first friction brake 10 to provide the second speed or intermediate drive ratio. This shift transition will accompnay no jerks because the one-way clutch 29 is gradually taken over by the first friction brake 10 with the increase in the fluid pressure.

When the accelerator pedal 25 is rapidly depressed while the vehicle is running in the 2 range, the governor pressure in the chamber 206 remains substantially unaffected; but the throttle pressure in the chamber 198 of the 1–2 shift valve 105 rises rapidly, with the result that this throttle pressure plus the line pressure in the chamber 194 overcomes the force of the spring 124 to move the 1–2 shift valve pistons 122 and 123 upwardly in FIG. 4D to their low speed positions. Thus, the ports 201 and 202 are disconnected from each other by the land 123b of the piston 123, while the latter port 202 is communicated with the bleed port 203. The first brake 10 is now disengaged, and the one-way clutch 29 functions to provide the first speed or low drive ratio. As the vehicle gains speed in this condition, the governor pressure rises in the chamber 206 to such an extent that the 1–2 shift valve pistons 122 and 123 are again moved to their high speed positions to provide the second speed or intermediate drive ratio. In this manner, when the manual valve 102 is in its 2 position, automatic shifting is possible between the first and second speed ranges.

D RANGE

When the selector lever is operated to move the manual valve 102 to its D position, the line pressure in the conduit 57 is directed through the port 174 of the manual valve 102, between the piston lands 114c and 114d, to the port 172 and thence to the conduit 74. The port 176 which has been in communication with the port 175 is now blocked by the land 114b and is, instead, communicated with the bleed port 178, so that the fluid pressure in the chamber 194 of the 1–2 shift valve 105 is discharged therefrom. With these exceptions the line pressure is admitted to the same conduits as when the manual valve was in the 2 position. The line pressure admitted as above mentioned to the conduit 74 is directed to the port 220 of the 2–3 shift valve 107, which is blocked by the land 129c when the piston 129 is held upward in FIG. 4C in its low speed position due to the low governor pressure at low vehicle speed, as is previously discussed for the second speed or intermediate drive ratio.

As the vehicle gains speed so that the correspondingly increased governor pressure in the chamber 206 overcomes the throttle pressure in the chamber 214 and the force of the spring 128 to depress the 2–3 shift valve piston 129 to its high speed position, the line pressure from the conduit 74 is directed through the port 220, between the lands 129c and 129d, to the port 217 and thence to the port 95 of the second modulator valve 108 through the conduit 73. The fluid pressure from the port 95 is then directed between the lands 130a and 130b to the conduits 75c and 65 through the port 94, and also to the port 98 through the orifice 130c. The fluid pressure admitted to the conduit 75c is supplied to the actuating chamber 234 of the second friction clutch 9 through the conduit 75a, to the releasing chamber 239 of the first friction brake 10 through the conduit 75b, and to the chamber 87 of the first modulator valve 106 through the conduit 75.

As the fluid pressure in these chambers 234, 239 and 87 (hereinafter referred to more simply as the fluid pressure in the chamber 234) rises to a level only slightly below the level at which the second friction clutch 9 begins torque transmission, the fluid pressure in the chamber 98 of the second modulator valve 108 depresses the piston 130 against the first spring 169 thereby disconnecting the ports 94 from the port 95 and also communicating the ports 94 with the bleed port 93. Thus, the fluid pressure in the chamber 234 is kept modulated at the aforesaid level.

On the other hand, the fluid pressure directed to the conduit 65 through the port 94 of the second modulator valve 108 is fed into the chamber 96 thereof through the port 90, thus tending to displace the second piston 132 upwardly afer a certain lapse of time caused by the orifice 79. However, since the fluid pressure in the actuating chamber 236 of the first friction brake 10 is directed through the conduits 59 and 59a to the chamber 97 of the second modulator valve 108 to displace the third piston 131 downwardly and hence to depress the second piston 132 through the second spring 168, this fluid pressure in the chamber 97 tending to depress the third piston 131, plus the downwardly exerted force of the first spring 169, can be overcome by the fluid pressure in the chamber 96 tending to upwardly displace the second piston 132 only when the fluid pressure in the actuating chamber 236 of the first friction brake 10 decreases for a shift from the second to third speed drive to such an extent as to permit sliding of the brake 10. This can be accomplished by providing a suitable difference between the effective areas of the second piston 132 and the third piston 131.

Thus, when the first friction brake 10 starts sliding, the second piston 132 of the second modulator valve 108 is displaced upwardly. Since now the piston 130 is subject to the increased upward pressure of the first spring 169, the pressure modulated by this piston 130, that is, the fluid pressure in the chamber 234, gradually increases with the lapse of time. Thereafter, as the fluid pressure in the chamber 97 becomes less than the force of the compressed second spring 168, the third piston 131 will be rapidly moved back to its upward position. The force of the spring 168 and the effective area of the third piston 131 must be so predetermined that the fluid pressure existing at that time in the chamber 97, that is, the fluid pressure in the chamber 236, will permit the first friction brake 10 to become disengaged. It is also necessary, moreover, that the bore of the orifice 79 and the effective area of the second piston 132 be so predetermined that the fluid pressure existing at that time in the chamber 234 is sufficient for torque transmission necessary at the instant by the second friction clutch 9. The fluid pressure in the chamber 234 succeedingly rises to the line pressure in response to the fluid pressure in the chamber 96 which is under the control of the orifice 79.

Smooth transition is thus carried out from the second speed or intermediate drive ratio, in which the first friction clutch 8 and the first friction brake 10 are engaged, to the third speed or high drive ratio in which the first and second friction clutches 8 and 9 are engaged. When the vehicle speed is comparatively low while the transmission provides the high ratio, and when the governor pressure is correspondingly low, the piston 129 of the 2–3 shift valve 107 will be in its low speed position due to the force of the spring 128 and the throttle pressure in the chamber 214. The piston 123 of the 1–2 shift valve 105 will then be in its high speed position due to the force of the spring 124. As a result, the line pressure is supplied to the first friction clutch 8 and the second friction brake 10 to provide the second speed as when the manual valve 102 is in its 2 position.

As the vehicle speed increases, the correspondingly increased governor pressure causes the 2–3 shift valve piston 129 to move to its high speed position. The second friction clutch 9 is now engaged and, with the actuating chamber 236 of the first friction brake 10 exhausted, the line pressure is supplied to the releasing chamber 239 thereof to release the same in cooperation with the spring 152. The first and second friction clutches 8 and 9 are thus both engaged to provide the third speed or high drive ratio.

When the vehicle speed decreases, a downshift occurs from the third to the second speed. In this case, too, like the second modulator valve 108 in the above described case of the upshift, the first modulator valve 106 functions in such a manner that, as the fluid pressure in the chamber 234 of the second friction clutch 9 starts decreasing, the pressure supplied to the first friction brake 10 is maintained at a level slightly below its level at which the brake 10 starts torque transmission until the fluid pressure in the chamber 234 of the second clutch 9 decreases close to a level at which the clutch 9 starts sliding.

As the engaging pressure of the second clutch 9 further decreases, the pressure tending to engage the first brake 10 may be correspondingly increased, and the second clutch 9 may be disengaged when the first brake 10 has become ready for torque transmission necessary at the instant. A smooth downshift from the third to the second is thus possible as the fluid pressure in the actuating chamber 236 of the first brake 10 is succeedingly elevated to the level of the line pressure.

When the vehicle is traveling in the second speed range with the manual valve in its D position, and at less than a predetermined speed (e.g. 40 kilometers per hour), violent depression of the accelerator pedal 25 results in the rapid elevation of the throttle pressure. The resultant increase in the throttle pressure in the chamber 198 of the 1–2 shift valve 105 causes the piston 123 to move upwardly to its low speed position against the governor pressure in the chamber 206 and the force of the spring 124. The conduits 63b and 72 are now disconnected from each other, and the line pressure for engagement of the first friction brake 10 is discharged through the bleed port 203. Thus, it is the first friction clutch 8 only that now remains engaged to provide the first speed or low drive ratio in cooperation with the one-way clutch 29.

When the vehicle is traveling in the third speed range with the manual valve in its D position, and at less than another predetermined speed (e.g. 80 kilometers per hour), rapid depression of the accelerator pedal produces a throttle pressure in accordance with the degree of depression of the accelerator pedal. This throttle pressure overcomes the governor pressure in the chamber 206 to move the 2–3 shift valve piston 129 to its low speed position thereby to effect a downshift to the second speed range.

When the throttle pressure produced as above described is higher and when the vehicle speed is lower, not only is the 2–3 shift valve piston 129 moved to its low speed position but the 1–2 shift valve piston 123 is also moved to its low speed position as the throttle pressure in the chamber 198 overcomes the governor pressure in the chamber 206 and the force of the spring 124. Thus, a kickdown to the second or the first speed range is possible depending upon the vehicle speed and the degree of depression of the accelerator pedal 25. During operation in the second or the third speed range with the manual valve in the D position, too, as in the case of the 2 position of the manual valve, the line pressure is supplied to the chamber 164 of the pressure regulator valve 103 through the conduits 72 and 72a, so that the line pressure has an approximately constant low value.

MANUAL DOWNSHIFTS

The transmission may be manually downshifted to the intermediate or the low speed ratio from operation in the high speed ratio with the selector lever in the D position by moving the selector lever to the 2 or L position, and may also be downshifted to the low speed ratio from operation in the intermediate speed ratio with the selector lever in the 2 position by moving the selector lever to the L position. For the manual downshift from the high to the intermedaite speed ratio, too, the first modulator valve 106 functions to effect smooth transition as in the case of the automatic downshift. The manual downshift to the low sEeed ratio is also carried out in the same manner as for the automatic downshift.

The manual downshift to the low speed ratio from operation in the high or intermediate speed ratio is inhibited to prevent the transmission from shifting to a lower ratio when the vehicle speed is too high to prevent engine overspeeding. Such downshifts are inhibited as follows. When operating with the selector lever in the D or 2 position and with the transmission in the high or intermediate speed ratio, and when the manual downshift is effected to the low speed ratio, the accelerator pedal 25 may be moved to its throttle-closing position so that the throttle pressure in the chamber 198 of the 1–2 shift valve 105 becomes substantially zero.

Accordingly, the resultant of the governor pressure in the chamber 206 and the force of the spring 124 is now counterbalanced only by the line pressure in the chambers 194 and 196 (i.e. the product of the value of the line pressure multiplied by the cross sectional area of the land 122b). If this line pressure is smaller than the resultant of the governer pressure and the force of the spring 124, that is, if the vehicle speed is more than a predetermined level, the manual down-shift will not be accomplished and the transmission will remain in the intermediate speed ratio. The low speed ratio will be obtained only when the vehicle speed is less then the predetermined level.

REVERSE

When the manual valve 102 is moved to its R or reverse position by the selector lever, the line pressure from the conduit 57 is admitted into the ports 176, 177 and 178 of the manual valve. The line pressure directed from the port 176 to the chamber 194 of the 1–2 shift valve 105 cooperates as above described with the line pressure admitted to the chamber 196 of the 1–2 shift valve from the port 177 to hold the valve pistons 122 and 123 in their low speed positions. The said line pressure from the port 177 of the manual valve is further directed through the ports 205 and 204 of the 1–2 shift valve to the actuating chamber 242 of the second friction brake 11 to engage the same.

The line pressure admitted into the port 176 of the manual valve is also directed to the chamber 216 of the 2–3 shift valve 107 through the conduits 68 and 68a and cooperates with the spring 128 to move the 2–3 shift valve piston 129 upwardly in FIG. 4C to its low speed position. Thus, the line pressure from the port 178 of the manual valve is now directed through the conduit 70, the port 223 of the 2–3 shift valve 107, between the lands 129c and 129d of the valve piston 129, the port 217, the conduit 73, the port 95 of the second modulator valve 108, between the lands 130a and 130b of the first piston 130, the port 94, the conduits 75c, 75, 75a and 75b, to the actuating chamber 234 of the second friction clutch 9 and to the releasing chamber 239 of the first friction brake 10, thereby engaging the former and disengaging the latter. At this time the actuating chamber 231 of the first friction clutch 8 is in open communication with the bleed port 171 of the manual valve 102 through the conduits 63a and 63 and port 162, so that the first clutch is disengaged.

For this shift to the reverse drive, too, the second modulator valve 108 functions to minimize the jerks of the transition by controlling the fluid pressure supplied to the second friction clutch 9, as does the first modulator valve 106 when the manual valve has been moved to the 2 position. It is accordingly possible to effect smooth transition from the various forward drives to the reverse drive, which drive is accomplished as the second friction clutch 9 and the second friction brake 11 are engaged.

While in the intermediate and high speed forward drives fluid pressure is fed into the chamber 164 of the pressure regulator valve 103 from the port 202 of the 1–2 shift valve 105 through the conduits 72 and 72a to regulate the line pressure to its minimum value, and while in the low speed forward drive the said chamber 164 of the pressure regulator valve 103 is exhausted to regulate the line pressure to an intermediate value, fluid pressure is supplied from the port 178 of the manual valve 102 to the chamber 168 of the pressure regulator valve 103 through the conduits 70 and 70a to regulate the line pressure to its maximum value for this reverse drive. The maximum value of line pressure is desirable at this time so that the second clutch 9 and the second brake 11 will be engaged with sufficient force for the transmission to transmit the heavy torque loads existing during operation in the reverse ratio.

Since the driven shaft 2 revolves in the opposite direction for operation in the reverse ratio, the rear pump 101 does not operate so that fluid is not supplied to the conduits 61 and 62. The governor valve 113 does not operate, either, and governor pressure is not produced. Since then the chamber 206 is completely exhausted, the 1–2 shift valve pistons 123 and 122 are urged downwardly only by the spring 124. No downward pressure is exerted to the 2–3 shift valve piston 129 so that this piston is held in its low speed position by the line pressure in the chamber 216 and by the spring 128.

Figure 5:
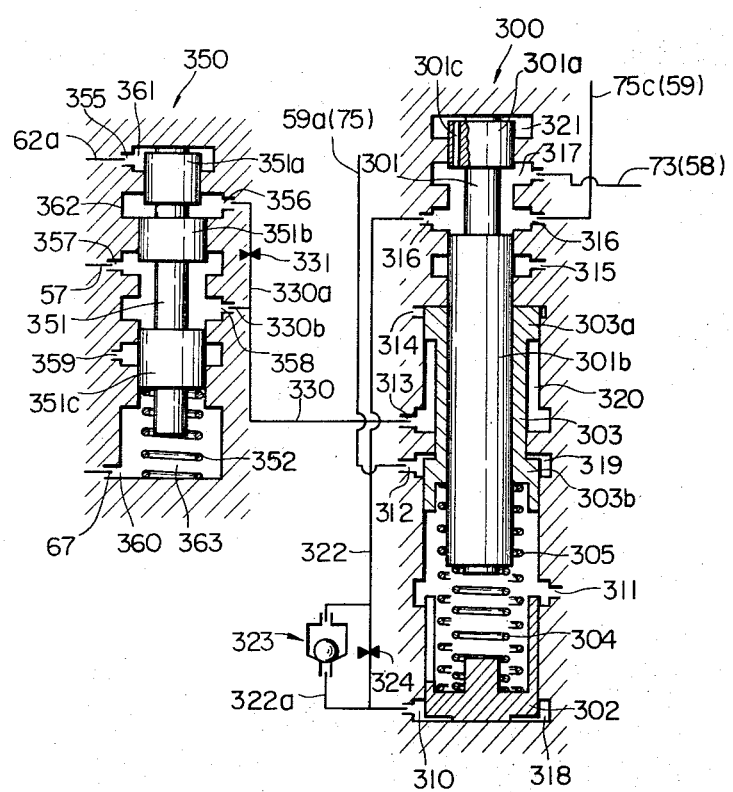
FIG. 5 is a schematic diagram showing another preferred embodiment of the invention.

FIG. 5 illustrates another preferred embodiment of this invention, in which the operation of a modulator valve 300, which may be considered a substitute for the first and second modulator valves 106 and 108 in the preceding embodiment, is controlled according to the torque transmitted by the transmission during each shift transition, in such a manner that the modulator valve will produce a fluid pressure responsive to the torque. The modulator valve 300 comprises a first piston 301 having lands 301a and 301b of equal diameter, a second piston 302 positioned axially below the first piston 301 in the drawing, a third piston 303 slidably but fluid tightly fitted over the land 301b of the first piston 301, a first spring 304 extending between the first piston 301 and the second piston 302, and a second spring 305 extending between the pistons 302 and 303.

The modulator valve 300 further comprises ports 310, 311, 312, 313, 314, 315, 316 and 317 and chambers 318, 319, 320 and 321. The ports 311, 314 and 315 are bleed ports. The port 310 communicates through the conduit 322 with the port 316 and thence with the actuating chamber 234 of the second friction brake 9 and releasing chamber 239 of the first friction brake 10 (the actuating chamber 236 of the first friction brake 10) through the conduit 75c (59), as may be seen from FIG. 4C. The port 312 communicates through the conduit 59a (75) with the actuating chamber 236 of the first friction brake 10 (the actuating chamber 234 of the second friction clutch 9). The port 313 communicates with the port 358 of a control valve 350 through conduits 330 and 330b and further with the port 356 of the valve 350 through a conduit 330a having an orifice 331. The port 317 communicates through the conduit 73 (58) with the line pressure conduit 74 for the third speed range (the line pressure conduit 72 for the second speed range).

The control valve 350 comprises a piston 351 having lands 351b and 351c of equal diameter and another land 351a of smaller diameter and a spring 352 yieldably urging the piston 351 upwardly in FIG. 5. The control valve 350 further comprises ports 355, 356, 357, 358, 359 and 360 and chambers 361, 362 and 363. The port 355 communicates with the governor pressure conduit 62a. The port 360 communicates with the throttle pressure conduit 67. The port 356 communicates with the port 358 through the conduits 330a and 330b, the conduit 330a having the orifice 331, and the ports 356 and 358 commonly communicate through the conduit 330 with the port 313 of the modulator valve 300. The port 357 communicates with the line pressure conduit 57. The port 359 is a bleed port.

In this second preferred embodiment of the invention, constructed substantially as above described, the line pressure is supplied from the conduit 57 to the control valve 350, which is always in operation, through its port 357 and is delivered into the conduit 330 is a manner controlled as follows by the governor pressure in the chamber 361 and the throttle pressure in the chamber 363. The line pressure supplied from the conduit 57 is directed to the port 358 between the lands 351b and 351c and is thence admitted into the chamber 362 through the conduits 330b and 330a and the port 356. The fluid pressure in this chamber 362 acts on the difference between the effective areas of the lands 351a and 351b.

The control valve piston 351 is thus moved either upwardly or downwardly by the resultant of this fluid pressure and the governor pressure in the chamber 361 or by the resultant of the force of the spring 352 and the throttle pressure in the chamber 363. The bleed port 359 being thus opened or closed by the land 351c, there is provided in the conduit 330 a fluid pressure responsive to the throttle pressure and governor pressure supplied to this control valve 350. The orifice 331 is provided to prevent the control valve 350 from vibratory motion that may be caused by the fluctuations of the line pressure.

The controlled output pressure of the control valve 350 is supplied at all times into the chamber 320 of the modulator valve 300 through its port 313 and is imparted to the land 303a of the third piston 303 to urge the same upwardly in FIG. 5. When the first brake 10 (second clutch 9) is engaged, the fluid pressure causing this engagement of the brake 10 (clutch 9) is also supplied to the chamber 319 of the modulator valve 300 to act on the land 303b. Since this fluid pressure is higher than the aforesaid controlled output pressure of the control valve 350, it overcomes the fluid pressure in the chamber 320 and the force of the second spring 305 to move the third piston 303 downwardly as seen in FIG. 5 into direct contact with the second piston 302. The second piston 302 is thus also moved downwardly.

If, in this condition, a shift is made from the first brake 10 (second clutch 9) to the second clutch 9 (first brake 10), the line pressure will be introduced into the modulator valve 300 through the conduit 73 (58) and the port 317. The line pressure introduced into the modulator valve 300 is directed, on the one hand, into its chamber 321 through the orifice 301c (which has a greater bore than the orifice 324, being adapted to prevent vibrations of the valve piston 301) and, on the other hand, into the actuating chamber 234 (236) of the second clutch 9 (first brake 10) through the port 316 and the conduit 75c (59).

The fluid pressure from the port 316 is also directed into the chamber 318 through the conduit 322 and the port 310 with a certain time lag caused by the orifice 324. The fluid pressure admitted into the chamber 321 of the modulator valve 300 tends to depress the first piston 301 against the spring 304 to open or close the bleed port 315, thereby causing the modulator valve 300 to provide an output pressure in accordance with the force of the spring 304. It is assumed that the force of the spring 304 is so predetermined that the output pressure of the modulator valve 300 has a value only slightly less than the value at which the second clutch 9 (first brake 10) begins to be engaged.

Thereafter, as the fluid pressure admitted into the chamber 318 of the modulator valve 300 through the orifice 324 increases its value with the lapse of time, the fluid pressure in the chamber 319 which causes engagement of the first brake 10 (second clutch 9) gradually decreases. Accordingly, the second piston 302 and the third piston 303 can be both elevated by the control pressure in the chamber 320 and the fluid pressure in the chamber 318 when the fluid pressure in the chamber 319 has lowered to a predetermined value, by properly setting the bore of the orifice 324. The elevated second piston 302 compresses the first spring 304, so that the pressure modulated by the piston 301 starts rising to increase the fluid pressure for engagement of the second clutch 9 (first brake 10).

As the fluid pressure in the chamber 319 for engagement of the first brake 10 (second clutch 9) further decreases to such a value that torque is no longer transmitted thereby, the fluid pressure in the chamber 318 further rises so that the output pressure of the modulator valve 300 becomes sufficient for the second clutch 9 (first brake 10) to transmit torque required at that instant.

At this time the control pressure in the chamber 320 cooperates with the fluid pressure in the chamber 318 in such a manner that if a large amount of torque must be transmitted at the instant, the second clutch 9 (first brake 10) will be quickly engaged under sufficient pressure, because then the first brake 10 (second clutch 9) starts sliding while being still supplied with considerably high pressure for engagement. On the other hand, if the amount of torque that must be transmitted at the instant is relatively small, the rate of increase of the fluid pressure for engagement of the second clutch 9 (first brake 10) will be delayed. Thus, the rate of increase of the fluid pressure for engagement of the second clutch 9 (first brake 10) is modulated in accordance with the variable torque transmitted by the transmission.

Following the complete engagement of the second clutch 9 (first brake 10), the fluid pressure in the chamber 318 of the modulator valve 300 becomes approximately equal in value to the fluid pressure in the actuating chamber 234 (236) of the second clutch 9 (first brake 10). The output fluid pressure of the modulator valve 300 also becomes equal in value to the line pressure in the conduit 73 (58) and the fluid pressure in the aforesaid actuating chamber 234 (236) rises to the level of the line pressure.

Since, in this second preferred embodiment of the invention, the value of the fluid pressure for engagement of the second clutch 9 (first brake 10) at the moment when it starts sliding is modulated in accordance with the amount of torque transmitted at the instant, the modulator valve 300 operates in response to the pressure in inverse proportion to the governor pressure and in proportion to the throttle pressure to make possible smooth and vibrationless ratio changes.

Figure 6:
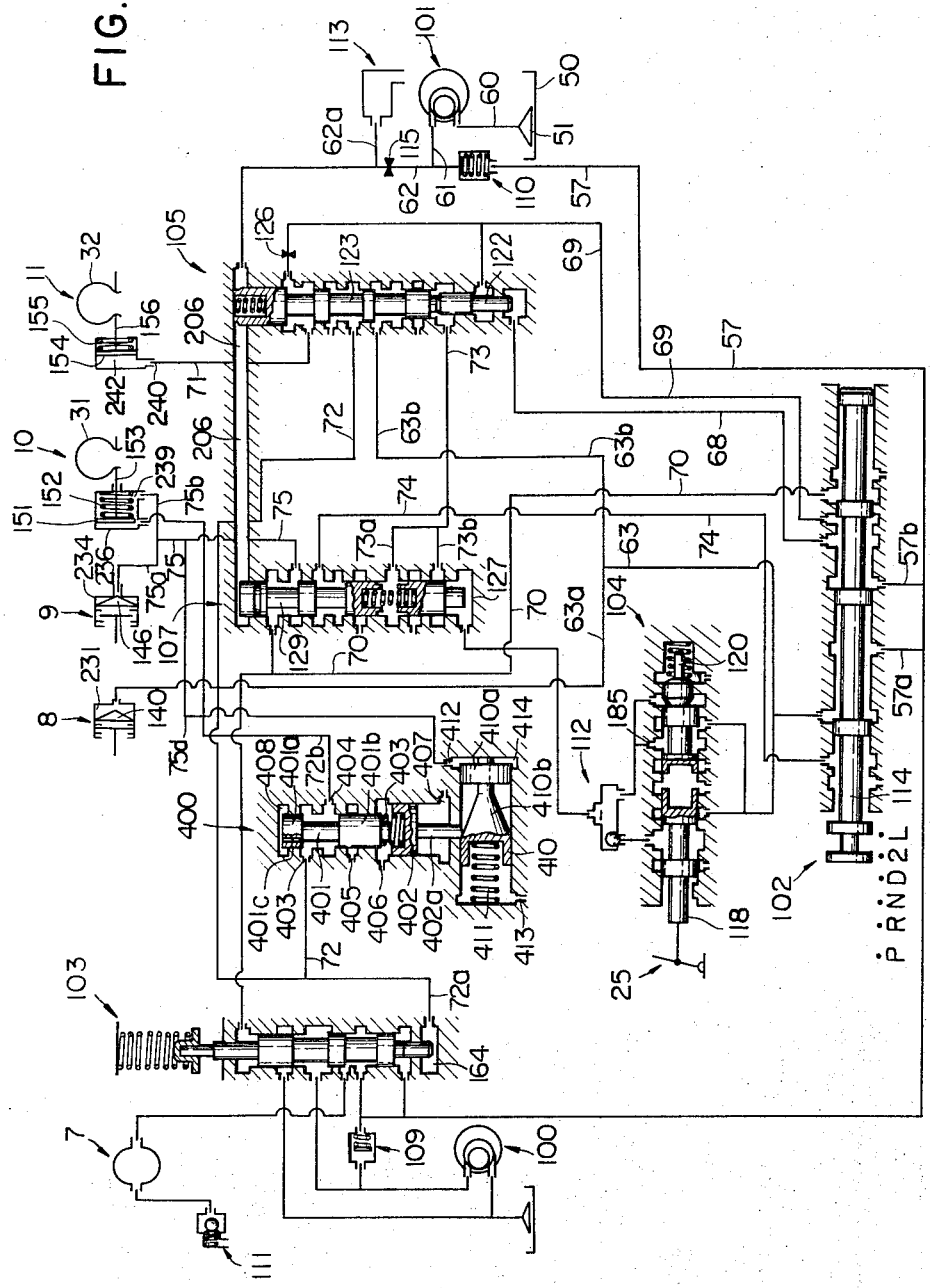
FIG. 6 is a schematic diagram showing still another preferred embodiment of the invention.

FIG. 6 illustrates still another preferred embodiment of the invention, in which a first friction clutch 8, a second friction clutch 9, a first friction brake 10, a second friction brake 11, a front pump 100, a rear pump 101, a manual valve 102, a pressure regulator valve 103, a 1–2 shift valve 105, a 2–3 shift valve 107, check valves 109 and 110 and a governor valve 113 are substantially identical, in both construction and operation, with those illustrated in FIGS. 4A, 4B, 4C and 4D, so that no more explanation will be given of these elements of the control system.

A modulator valve 400 incorporated in this control system comprises a piston 401 having lands 401a and 402b of equal diameter, a valve seat member 402 positioned coaxially below the piston 401 and having a rod 402a extending downwardly therefrom, a compression spring 403 extending between the piston 401 and the valve seat member 402, a cam piece 410 extending at right angles with the rod 402a and having a cam face 410b and a land 410a, and a spring 411 yieldably urging the cam piece 410 rightwardly in FIG. 6. The modulator valve 400 further comprises ports 403, 404, 405, 406, 407, 412 and 413, chambers 408 and 414, and an orifice 401c. The ports 405, 406, 407 and 413 are bleed ports. The port 403 communicates with the 1–2 shift valve 105 through the conduit 72 and is supplied with line pressure when the piston 123 is in its high speed position. The port 403 also communicates with the chamber 164 of the pressure regulator valve 103 through the conduits 72 and 72a. The port 404 communicates with the actuating chamber 236 of the first friction brake 10 through the conduit 72b. The port 412 communicates with the conduit 75 through the conduit 75d.

In operation, the modulator valve 400 operates for the shift between the second and third speed ratios. During operation in the second speed ratio, the 1–2 shift valve piston 123 is in its high speed position so that line pressure is admitted into the conduit 72. This line pressure is directed through the port 403 of the modulator valve 400, between the lands 401a and 401b of its piston 401, through the port 404 and the conduit 72b to the actuating chamber 236 of the first friction brake 10 to cause engagement thereof.

Although the fluid pressure simultaneously admitted into the chamber 408 of the modulator valve 400 through the orifice 401c tends to depress the piston 401, this piston is now retained in its illustrated position by the spring 403 compressed by the valve seat member 402 which is held in its elevated position by the cam face 410b of the cam piece 410 held in its illustrated position by the spring 411. The line pressure in the conduit 72 is further admitted into the pressure-reducing chamber 164 of the pressure regulator valve 103 through the conduit 72a to regulate the output pressure of the valve 103 to a value appropriate for operation in the second speed range.

If now an upshift is made to the third speed range, the 2–3 shift valve piston 129 moves to its high speed position so that the line pressure in the conduit 74 is admitted into the conduit 75. As a result, the pressures in the actuating chamber 234 of the second friction clutch 9, the releasing chamber 239 of the first friction brake 10 and the chamber 414 of the modulator valve 400 start rising. As the pressure in the chamber 414 elevates to such an extent as to overcome the force of the spring 411, the cam piece 410 will be urged to the left in FIG. 6. Since this leftward displacement of the cam piece 410 causes downward motion of the valve seat member 402, the force of the spring 403 becomes weakened, with the result that the fluid pressure in the chamber 408 depresses the piston 401 to deliver to the conduit 72b a fluid pressure in accordance with the variable force of the spring 403.

Since this fluid pressure is supplied to the actuating chamber 236 of the first friction brake 10, the force with which the first brake is engaged decreases in inverse proportion to the pressures in the actuating chamber 234 of the second friction clutch 9 and the releasing chamber 239 of the first brake 10. Therefore, by suitable determination of the forces of the springs 403 and 411, the cross sectional area of the land 401a of the piston 401, the cross sectional area of the land 410a of the cam piece 410, and the force of the return spring 152 of the piston 151 of the first brake 10, it is possible to cause the first brake 10 to start sliding at the moment when the second clutch 9 starts torque transmission, to cause the first brake 10 to stop torque transmission set under way, and to cause both the first brake 10 and the second clutch 9 to be in sliding engagement during the transition.

Operation of this third embodiment of the invention for a shift from the third to the second speed range is as follows. The line pressure in the conduit 75d is admitted into the chamber 414 of the modulator valve 400 during operation in the third speed range, so that the cam piece 410 is held in its left hand position in FIG. 6. If now the piston 129 of the 2–3 shift valve 107 moves to its low speed position, the pressures in the actuating chamber 234 of the second clutch 9, the releasing chamber 239 of the first brake 10 and the chamber 414 of the modulator valve 400 will lower gradually.

As a consequence, the cam member 410 is gradually returned to the right as seen in FIG. 6 by the spring 411 while elevating the valve seat member 402 by its cam face 410b. This upward motion of the valve seat member 402 results in the increase in the fluid pressure in the actuating chamber 236 of the first brake 10. It is accordingly possible, like the first described embodiment of the invention, for this FIG. 6 embodiment to regulate the rate of increase of the fluid pressure in the actuating chamber 236 of the first brake 10 in step with the varying fluid pressure in the actuating chamber 234 of the second clutch 9 to effect smooth downshift operation.

I claim:

1. In an automatic transmission having a drive shaft, a driven shaft, and at least two selectively engagable frictional engaging means provided between said shafts to establish different driving ratios between the shafts, a control system comprising:
   a source of fluid pressure;
   shift valve means provided between said source and said frictional engaging means and controlling selectively fluid pressure communication therebetween in a manner to engage one of said frictional engaging means and to disengage the other frictional engaging means;
   modulator valve means disposed between said shift valve means and said frictional engaging means and including first means responsive to reduction of engaging pressure in said other engaging means to be disengaged and second means responsive to an increase of the engaging pressure in said one engaging means to be engaged; and
   means associating said first and second means such that when said first means is in a condition subjected to a value of the engaging pressure at which slip of said other engaging means is about to occur, said second means is in a condition subjected to a value of the engaging pressure at which the engagement of said one engaging means is about to occur and that said first and second means thereafter operate to control the engaging pressures, in response to the respective engaging pressures of both said engaging means, so as to cause said one engaging means to be engaged and said other engaging means to be disengaged with the engaging pressures varying in inverse proportion to each other.

2. The automatic transmission as claimed in claim 1, in which said second means includes means displaceable in response to the engaging pressure of said one engaging means, and said first means includes means to control the engaging pressure of said other engaging means in response to the displacement of said displaceable means.

3. The automatic transmission as claimed in claim 2, in which said displaceable means includes cam means, and said first means includes a piston movable with said cam means to control the engaging pressure of said other engaging means.

4. The automatic transmission as claimed in claim 1, in which said second means includes pressure modulating means movable in one direction, in response to the engaging pressure of said one engaging means, thereby to keep the engaging pressure at a level slightly below the level at which said one engaging means begins torque transmission and moving means acted upon by the engaging pressure of said one engaging means through orifice means thereby to move said modulating means in the other direction, and said first means includes means responsive to the engaging pressure of said other engaging means to counteract said moving means.

5. The automatic transmission as claimed in claim 4, in which said modulator valve means modulates the fluid pressures for engagement and disengagement of said engaging means in such an interrelated manner that when, for a shift from one forward speed ratio to another, the fluid pressure which has been causing engagement of said one engaging means has decreased to a value at which no substantial torque transmission takes place through said one engaging means, and the fluid pressure supplied for engagement of said other engaging means will attain a value at which torque transmission takes place therethrough.

6. The automatic transmission as claimed in claim 4, in which said pressure modulating means of said second means includes a first piston operating to bleed the engaging pressure of said one engaging means, said moving means to move said modulating means in said other direction includes a second piston, and said first means includes a third piston.

7. The automatic transmission as claimed in claim 6, further including first spring means disposed between said first and second pistons, and second spring means disposed between said second and third pistons.

8. The automatic transmission as claimed in claim 4, in which said modulator valve means modulates the fluid pressure for engagement and disengagement of said engaging means in an interrelated manner in response to the variable amount of torque transmitted by the transmission during a shift from one forward speed ratio to another.

9. The automatic transmission as claimed in claim 8, in which said torque is in inverse proportion to the speed of a vehicle and in direct proportion to the opening of a throttle valve.

10. The automatic transmission as claimed in claim 9, further including control means generating an output pressure inversely proportional to the vehicle speed and porportional to the opening of the throttle valve, said output pressure being applied to said modulator valve means so as to counteract said first means of the modulator valve means.

* * * * *